(12) United States Patent
Abedini et al.

(10) Patent No.: US 11,096,033 B2
(45) Date of Patent: *Aug. 17, 2021

(54) NR DISCOVERY RESOURCE POOL CONFIGURATION FOR CV2X

(71) Applicant: QUALCOMM Incorporated, San Diego, CA (US)

(72) Inventors: Navid Abedini, Somerset, NJ (US); Zhibin Wu, Sunnyvale, CA (US); Sudhir Kumar Baghel, Hillsborough, NJ (US); Junyi Li, Chester, NJ (US); Kapil Gulati, Dover, DE (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 16/279,772

(22) Filed: Feb. 19, 2019

(65) Prior Publication Data

US 2019/0268748 A1    Aug. 29, 2019

Related U.S. Application Data

(60) Provisional application No. 62/634,525, filed on Feb. 23, 2018.

(51) Int. Cl.
*H04W 8/00* (2009.01)
*H04W 16/28* (2009.01)
(Continued)

(52) U.S. Cl.
CPC ............ *H04W 8/005* (2013.01); *H04L 67/16* (2013.01); *H04W 4/40* (2018.02); *H04W 4/46* (2018.02);
(Continued)

(58) Field of Classification Search
CPC .......... H04W 8/005; H04W 4/46; H04W 4/40
See application file for complete search history.

(56) References Cited

U.S. PATENT DOCUMENTS

| 2013/0157670 A1* | 6/2013 | Koskela | ................ H04W 76/14 |
| | | | 455/450 |
| 2019/0253955 A1* | 8/2019 | Abedini | ................. H04B 7/088 |

FOREIGN PATENT DOCUMENTS

| EP | 1973366 A2 | 9/2008 |
| EP | 2833694 A2 | 2/2015 |
| WO | 2017044155 A1 | 3/2017 |

OTHER PUBLICATIONS

International Search Report and Written Opinion—PCT/US2019/018783—ISA/EPO—dated May 16, 2019.

* cited by examiner

Primary Examiner — Siming Liu
(74) *Attorney, Agent, or Firm* — Arent Fox LLP

(57) ABSTRACT

Methods, apparatuses, and computer-readable mediums for wireless communication are disclosed by the present disclosure. In an example, a host device may determine a pool of preconfigured resources for discovery. The preconfigured resources are designated for one or more of: a discovery preamble, a query signal, a discovery message, and a random access preamble. The host device may transmit the discovery preamble on one or more resources designated for the discovery preamble. A client device may receive the discovery preamble and determine that the client device is interested in receiving information regarding the host device. The client device may transmit a query signal if interested. The host device may determine whether the query signal is received on a resource designated for the query (Continued)

signal in response to the discovery preamble. The host device may transmit a discovery message in response to receiving the query signal.

38 Claims, 10 Drawing Sheets

(51) Int. Cl.
    *H04W 4/40*           (2018.01)
    *H04L 29/08*         (2006.01)
    *H04W 4/46*          (2018.01)
    *H04W 74/08*        (2009.01)

(52) U.S. Cl.
    CPC ....... *H04W 16/28* (2013.01); *H04W 74/0808* (2013.01)

NR DISCOVERY RESOURCE POOL CONFIGURATION FOR CV2X

CLAIM OF PRIORITY UNDER 35 U.S.C. § 119

This application claims priority to U.S. Provisional Application No. 62/634,525, titled "NR DISCOVERY RESOURCE POOL CONFIGURATION FOR CV2X," filed Feb. 23, 2018, which is assigned to the assignee hereof, and incorporated herein by reference in its entirety.

BACKGROUND

Technical Field

The present disclosure relates generally to communication systems, and more particularly, techniques for cellular vehicle-to-everything (CV2X) in 5G New Radio (NR).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, CV2X communications may include devices discovering and communicating with other nearby devices. Beamforming techniques used with various frequency bands in NR may complicate existing discovery techniques. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure. In an aspect, the present disclosure includes a method of wireless communications. The method may include determining a pool of preconfigured resources for discovery. The preconfigured resources may be designated for one or more of: a discovery preamble, a query signal, a discovery message, and a random access preamble. The method may include transmitting the discovery preamble on one or more of the preconfigured resources designated for the discovery preamble. The method may include determining whether a query signal in response to the discovery preamble is received on one of the preconfigured resources designated for the query signal. The method may include transmitting a discovery message in response to receiving the query signal.

In another aspect, the disclosure includes an apparatus for wireless communications. The apparatus may include a memory and a processor communicatively coupled to the memory. The processor may be configured to determine a pool of preconfigured resources for discovery. The preconfigured resources may be designated for one or more of: a discovery preamble, a query signal, a discovery message, and a random access preamble. The processor may be configured to transmit the discovery preamble on one or more of the preconfigured resources designated for the discovery preamble. The processor may be configured to determine whether a query signal in response to the discovery preamble is received on one of the preconfigured resources designated for the query signal. The processor may be configured to transmit a discovery message in response to receiving the query signal.

In another aspect, the disclosure includes an apparatus for wireless communications. The apparatus may include means for determining a pool of preconfigured resources for discovery. The preconfigured resources may be designated for one or more of a discovery preamble, a query signal, a discovery message, and a random access preamble. The apparatus may include means for transmitting the discovery preamble on one or more of the preconfigured resources designated for the discovery preamble. The apparatus may include means for determining whether a query signal in response to the discovery preamble is received on one of the preconfigured resources designated for the query signal. The apparatus may include means for transmitting a discovery message in response to receiving the query signal.

In another aspect, the disclosure includes a non-transitory computer-readable medium storing computer-executable instructions executable by a processor. The computer-readable medium may include instructions to determine a pool of preconfigured resources for discovery. The preconfigured resources may be designated for one or more of a discovery preamble, a query signal, a discovery message, and a random access preamble. The non-transitory computer-readable medium may include instructions to transmit the discovery preamble on one or more of the preconfigured resources designated for the discovery preamble. The non-transitory computer-readable medium may include instructions to determine whether a query signal in response to the discovery preamble is received on one of the preconfigured resources designated for the query signal. The non-transitory computer-readable medium may include instructions to transmit a discovery message in response to receiving the query signal.

In another aspect, the disclosure includes a method of wireless communications for a UE. The method may include determining a pool of preconfigured resources for discovery. The preconfigured resources may be designated for one or more of: a discovery preamble, a query signal, a discovery message, and a random access preamble. The method may include receiving the discovery preamble on at least one of the preconfigured resources designated for the discovery preamble. The method may include determining, based on the discovery preamble, that the UE is interested in receiving information regarding a device that transmitted the discovery preamble. The method may include transmitting a query signal on one of the preconfigured resources designated for the query signal and corresponding to the discovery preamble. The method may include receiving the discovery message in response to transmitting the query signal.

In another aspect, the disclosure provides an apparatus for wireless communications for a user equipment (UE). The apparatus may include a memory and a processor communicatively coupled to the memory. The processor may be configured to determine a pool of preconfigured resources for discovery. The preconfigured resources may be designated for one or more of: a discovery preamble, a query signal, a discovery message, and a random access preamble. The processor may be configured to receive the discovery preamble on at least one of the preconfigured resources designated for the discovery preamble. The processor may be configured to determine, based on the discovery preamble, that the UE is interested in receiving information regarding a device that transmitted the discovery preamble. The processor may be configured to transmit a query signal on one of the preconfigured resources designated for the query signal and corresponding to the discovery preamble. The processor may be configured to receive the discovery message in response to transmitting the query signal.

In another aspect, the disclosure includes a user equipment (UE) for wireless communications. The UE may include means for determining a pool of preconfigured resources for discovery. The preconfigured resources may be designated for one or more of: a discovery preamble, a query signal, a discovery message, and a random access preamble. The UE may include means for receiving the discovery preamble on at least one of the preconfigured resources designated for the discovery preamble. The UE may include means for determining, based on the discovery preamble, that the UE is interested in receiving information regarding a device that transmitted the discovery preamble. The UE may include means for transmitting a query signal on one of the preconfigured resources designated for the query signal and corresponding to the discovery preamble. The UE may include means for receiving the discovery message in response to transmitting the query signal.

In another aspect, the disclosure includes a non-transitory computer-readable medium storing computer code executable by a processor of a UE for wireless communications. The non-transitory computer-readable medium may include one or more codes executable to determine a pool of preconfigured resources for discovery. The preconfigured resources may be designated for one or more of: a discovery preamble, a query signal, a discovery message, and a random access preamble. The non-transitory computer-readable medium may include one or more codes executable to receive the discovery preamble on at least one of the preconfigured resources designated for the discovery preamble. The non-transitory computer-readable medium may include one or more codes executable to determine, based on the discovery preamble, that the UE is interested in receiving information regarding a device that transmitted the discovery preamble. The non-transitory computer-readable medium may include one or more codes executable to transmit a query signal on one of the preconfigured resources designated for the query signal and corresponding to the discovery preamble. The non-transitory computer-readable medium may include one or more codes executable to receive the discovery message in response to transmitting the query signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
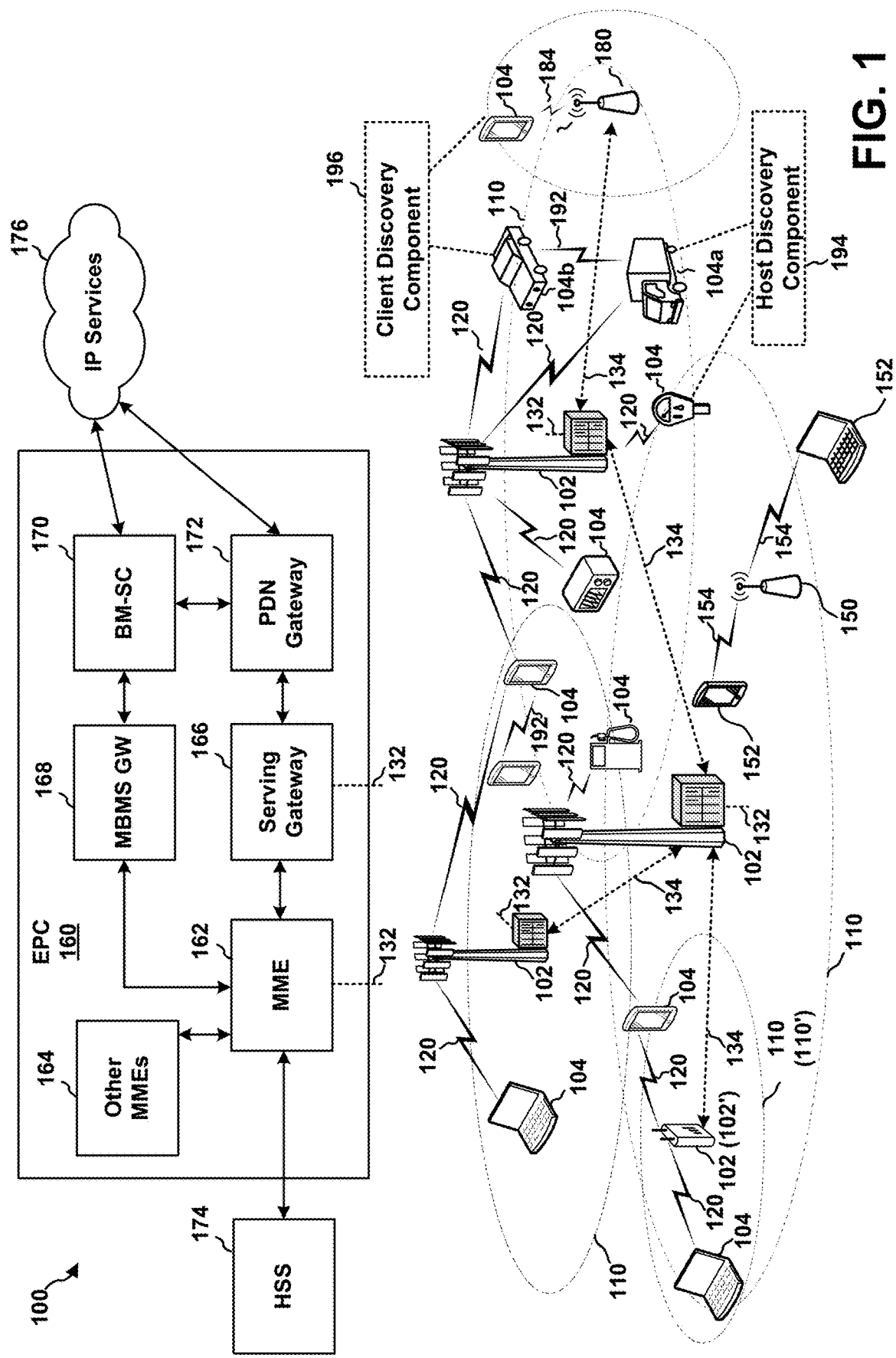
FIG. 1 is a block diagram illustrating an example of a wireless communications system and an access network.

Methods, apparatuses, and computer-readable mediums for wireless communication are disclosed by the present disclosure. In an example, a host device may advertise a service using a pool of preconfigured discovery resources and a client device may indicate interest in the service and initiate a connection with the host device using the preconfigured discovery resources. As used herein, the term "preconfigured resources" means that the resources are configured for use as discovery resources prior to any communication between the host device and the client device. For example, the preconfigured resources may be configured in a regulation, standards document, or in system information transmitted by a base station. Note that the resource preconfigured for discovery usage may or may not be exclusively used for discovery purpose, and UEs performing a non-discovery procedure may still be able to use the pre-configured discovery resources. That is, when the preconfigured resources are not exclusively for discovery usage, UEs may use the preconfigured resources for transmissions other than discovery transmissions. In an aspect, such a preconfiguration may only be known by UEs performing discovery-procedure, or known by both discovery UEs and non-discovery UEs as well. In particular, a discovery procedure may include a discovery preamble transmitted by the host device and a query transmitted by an interested client device. The discovery preamble may include a small amount of information and may be transmitted on one or more beams. For example, the discovery preamble may be one of several defined sequences that indicate the host device is available for a discovery procedure. The host device may transmit a discovery message only if the host device receives a query in response to the discovery preamble. The query may be used to determine beamforming for the discovery message to reduce the number of transmissions of the discovery message. Accordingly, the resources used for the discovery message may be reduced compared to beam sweeping the discovery message. Additionally, the preconfigured discovery resources may be used by the client device to transmit a random access preamble for initiating communications between the host device and the client device. In an aspect, when the discovery message is not transmitted, the preconfigured resources for the discovery message and/or the random access preamble may be repurposed for other communications. The present disclosure provides example configurations of discovery resources and techniques for reducing the overhead associated with the preconfigured discovery resources.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. Although an EPC 160 is illustrated, the wireless communications system may include a different core network such as a 5G Core (5GC). References herein to the EPC 160 may also refer to a 5GC. The base stations 102 may include macro cells (high power cellular base station) and/or small cell base stations (low power cellular base station). The UEs 104 may include host UEs 104a that advertise services on the preconfigured discovery resources and client UE 104b that respond to the one or more host UEs 104a.

The base stations 102 (collectively referred to as Evolved Universal Mobile Telecommunications System (UMTS) Terrestrial Radio Access Network (E-UTRAN)) interface with the EPC 160 and/or 5GC through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 and/or 5GC) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

Additionally, a gNodeB (gNB) 180 and/or one or more UEs 104 may operate in millimeter wave (mmW) frequencies and/or near mmW frequencies in communication with a UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range. Additionally, UEs 104 performing D2D communications may operate using mmW and may also utilize beamforming 184.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 and/or 5GC for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, one or more UEs 104 may be configured for CV2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104a may include a host discovery component 194 for advertising CV2X services supported by the host UE 104. A client UE 104b may include a client discovery component 196 for discovering CV2X services supported by the host UE 104a. Moreover, a UE 104 may act as both a host and a client. For example, a vehicle may act as a host to provide speed and braking updates to surrounding vehicles and act as a client to communicate with a tolling station. Accordingly, a single UE 104 may include both a host discovery component 194 and a client discovery component 196. Further details of the host discovery component 194 and the client discovery component 196 are illustrated in FIG. 10 and FIG. 11.

Figure 10:
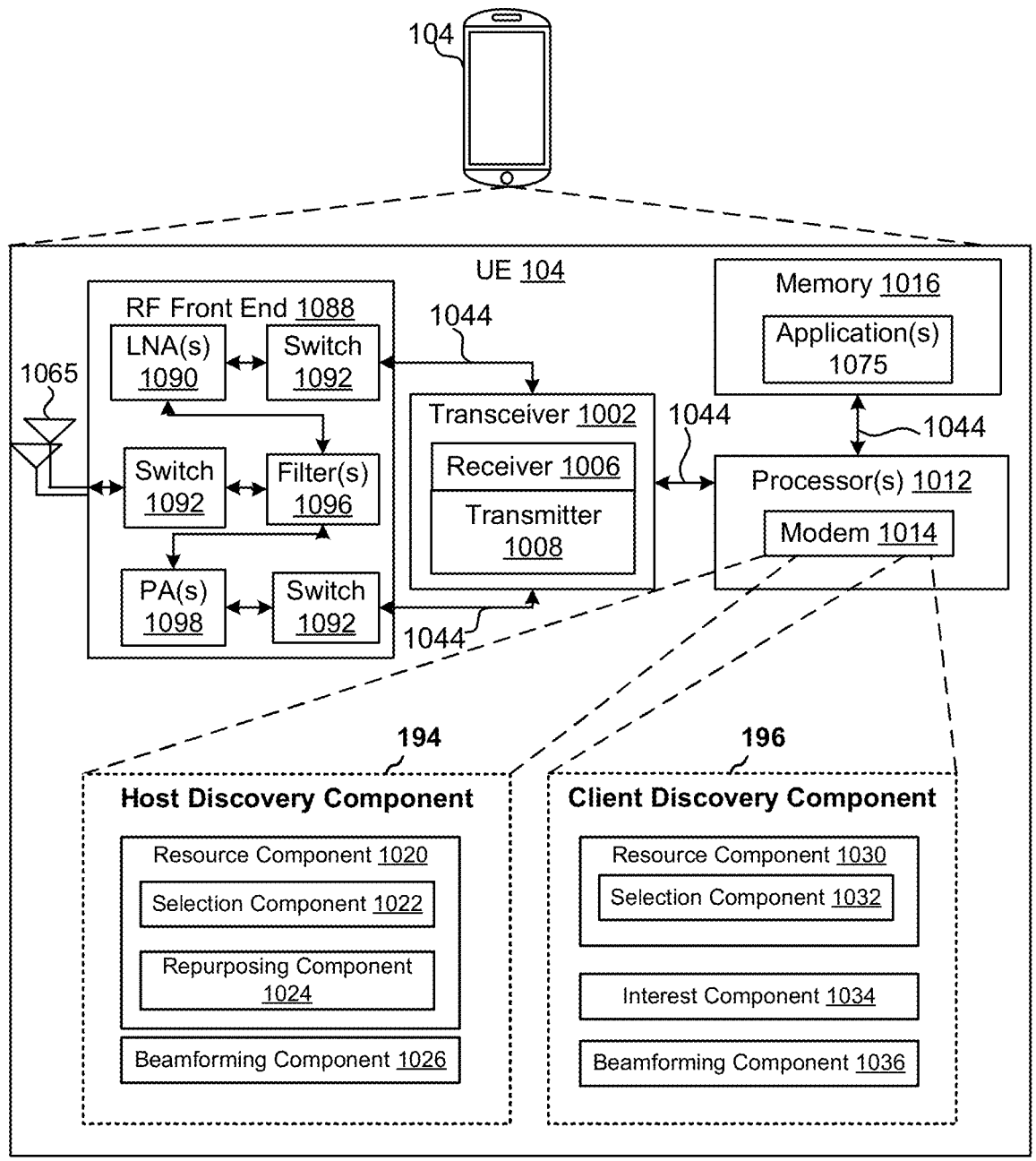
FIG. 10 is a schematic diagram of example components of the UE of FIG. 1.
Figure 11:
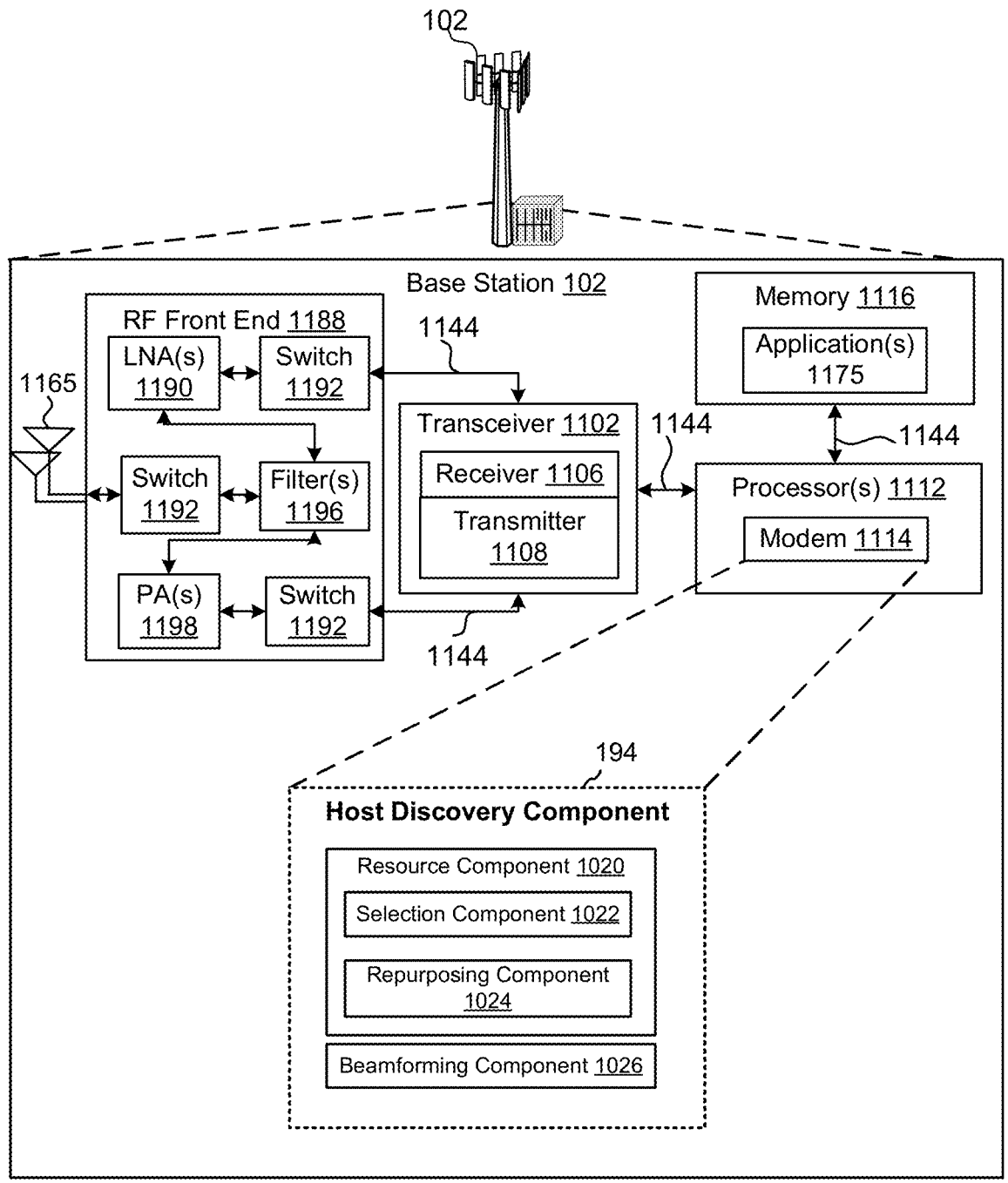
FIG. 11 is a schematic diagram of example components of the base station of FIG. 1.

Referring to FIG. 10 and FIG. 11, the host discovery component 194 may include a resource component 1020 for determining a pool of preconfigured resources to use for a discovery procedure and a beamforming component 1026 for determining which beams to use for transmitting and receiving. The resource component 1020 may include a selection component 1022 for determining a sub-pool of resources to be used by the UE 104 for transmitting or receiving and a repurposing component 1024 for allocating the preconfigured resources for a non-discovery communication when not being used for discovery.

The client discovery component 196, shown in FIG. 10, may include a resource component 1030, a beamforming component 1036, and an interest component 1034. Similar to the resource component 1020 of the host discovery component 194, the resource component 1030 of the client discovery component 196 may determine a pool of preconfigured resources to use for a discovery procedure. Likewise, the selection component 1032 of the client discovery component 196 may determine a sub-pool of resources to be used by the UE 104 for transmitting or receiving. The beamforming component 1036 of the client discovery component 196 may determine which beams to use for transmitting and receiving. In an aspect, where a UE 104 includes both a host discovery component 194 and a client discovery component 196, the resource component 1020 of the host discovery component 194 may be the same as the resource component 1030 of the client discovery component 196 and the beamforming component 1026 of the host discovery component 194 may be the same as the beamforming component 1036 of the client discovery component 196. The client discovery component 196 may also include an interest component 1034 for determining whether the UE 104 is interested in a received discovery preamble.

In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication.

During LOS situations, tracking of the UE 104 may be performed by the base station 102 or another UE 104 by focusing a beam onto the tracked UE 104. However, if the receiving UE 104 is in a Non-Line of Sight (NLOS) position, then a transmitter of the base station 102 may need to search for a strong reflected path which is not always available. An example of a UE 104 being in a NLOS position may include a first UE 104 located within a vehicle. When the first UE 104 is located within the vehicle, a base station 102 may have difficulty retaining LOS and the difficulty of retaining LOS may further increase when the vehicle is moving.

Further, compared to lower frequency communication systems, a distance between base stations 102 in a mmW communication system may be very short (e.g., 150-200 meters between gNBs). The short distances may result in a short amount of time required for a fast handover between base stations 102. The short distance and the fast handovers may cause difficulty to the base station 102 in maintaining a LOS beam on a UE 104 when the UE 104 is, for example, located within a vehicle as even small obstacles like a user's finger on the UE 104 or the vehicle windows or windshield act as obstacles to maintaining the LOS.

Figure 2:
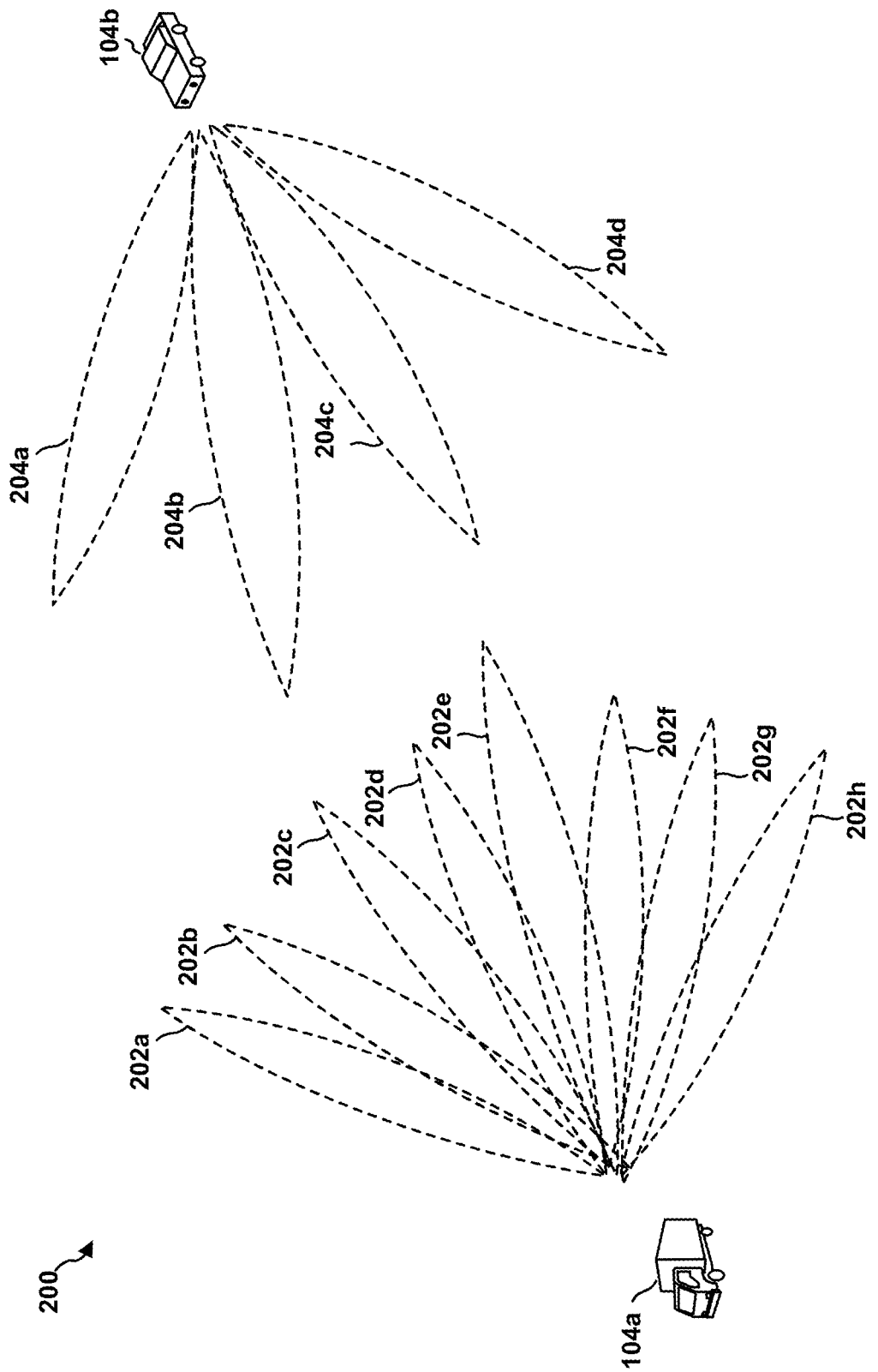
FIG. 2 is a block diagram of example UEs communicating using beamforming.

FIG. 2 is a diagram 200 illustrating a host UE 104a in communication with a client UE 104b. Referring to FIG. 2, the host UE 104a may transmit one or more beams 202a, 202b, 202c, 202d, 202e, 202f, 202g, and/or 202h to the client UE 104b, where the beams may be in one or more directions. The client UE 104b may receive the one or more beams 202a-202h in the same direction as transmitted by the host UE 104a or in another direction due to reflection. The client UE 104b may also transmit one or more beams 204a, 204b, 204c, and/or 204d to the host UE 104a, where the beams may be in one or more directions. The host UE 104a may receive the one or more beams 204a-204d in the same direction as transmitted by the client UE 104b or in another direction due to reflection. The host UE 104a and/or the client UE 104b may perform beam training to determine the best beams for each of the host UE 104a/the client UE 104b to transmit/receive. For example, by providing feedback regarding a strongest beam.

The use of beamforming may impact discovery signals for CV2X communication. In some conventional D2D systems, discovery signals are broadcast by a host device to allow other devices to discover services offered by the host device. When beamforming is used to transmit a discovery signal, devices that are not positioned directly within the beam may not receive the signal. In an aspect, multiple transmissions of a discovery signal may be used to perform beam sweeping by transmitting the discovery signal in different directions. The multiple transmissions, however, may increase resource usage for the discovery signal.

Figure 3:
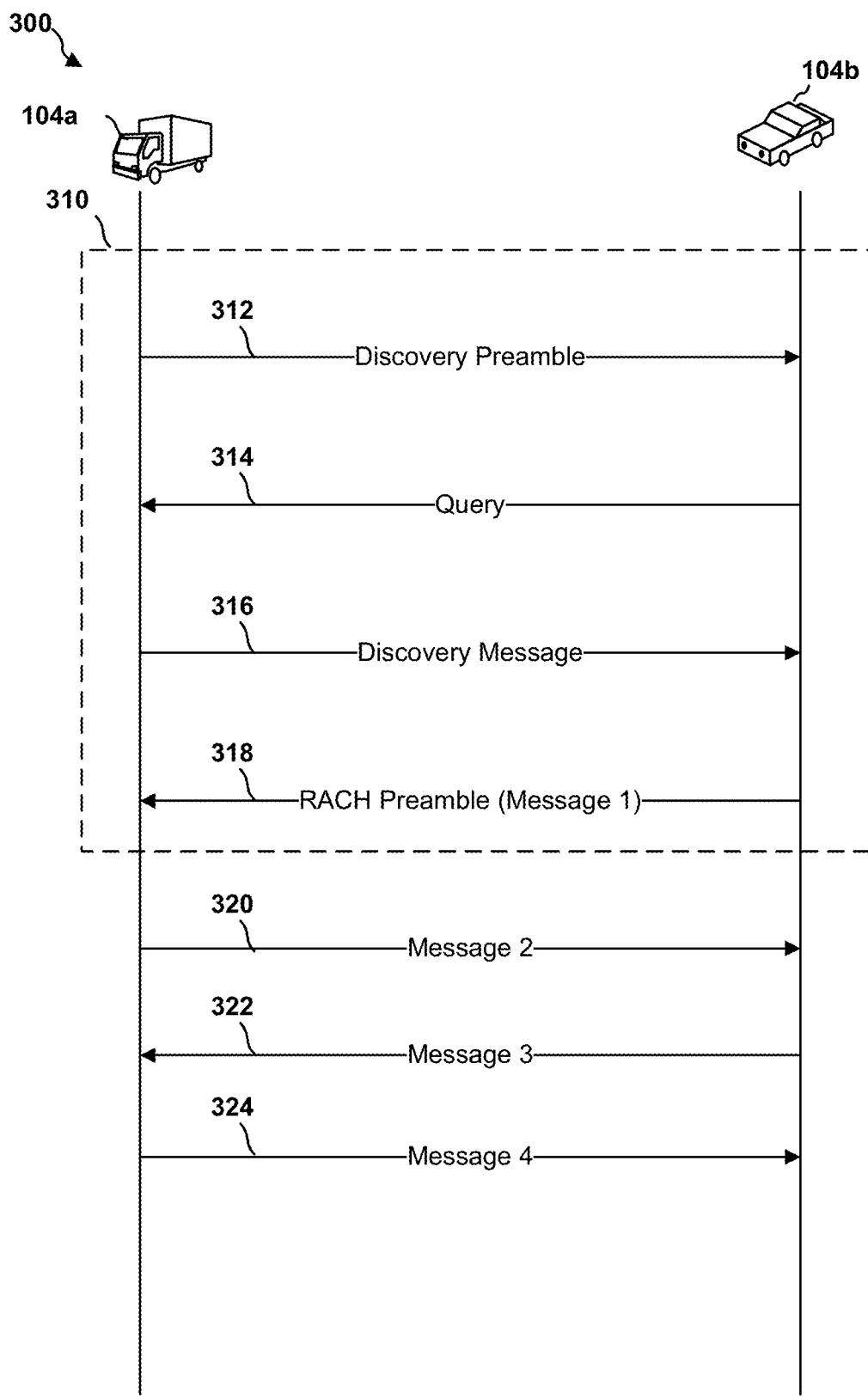
FIG. 3 is a message diagram showing an example of discovery and connection setup between UEs.

FIG. 3 is a message diagram 300 illustrating example signals that may be used for discovery and connection establishment between the host UE 104a and the client UE 104b. Although the illustrated example shows a host UE 104a, in an aspect, a base station 102 may be a host and perform the actions of a host UE 104a as described below. In an aspect, one or more discovery signals may utilize preconfigured discovery resources 310. In a CV2X system, a host UE 104a may not have information regarding the other UEs 104b with which the host UE 104a may want to communicate. By using the preconfigured discovery resources 310, the UEs 104 may limit a search space for discovering other UEs 104 and reduce overhead associated with discovery signals. Further, the discovery signals may reduce overhead by limiting discovery signal transmission unless a host UE 104*a* receives an indication that a device (e.g., a client UE 104*b*) is present that is interested in receiving the discovery signal. The discovery signals utilizing the preconfigured discovery resource 310 may include a discovery preamble 312, a query 314, a discovery message 316, and a RACH preamble 318. The RACH preamble 318 may also be referred to as a RACH Message 1.

The discovery preamble 312 may be a transmission from a host UE 104*a* indicating that the host UE 104*a* is capable of communicating (e.g., offering a service). For example, the discovery preamble 312 may be one predefined sequence selected from a set of predefined sequences. The selection of the predefined sequence may convey a limited amount of information. For example, the discovery preamble 312 may be selected based on a type of the host UE 104*a* or a type of service offered by the host UE 104*a*. As discussed in further detail below, the host UE 104*a* may transmit the discovery preamble 312 using discovery preamble resources within the preconfigured discovery resources 310. The host UE 104*a* may select which beams to use for the discovery preamble to attempt to reach potentially interested devices (e.g., one or more client UEs 104*b*).

The query 314 may be a transmission from a client UE 104*b* indicating that the client UE 104*b* is interested in obtaining further information from the host UE 104*a*. For example, the query 314 may be a preamble or other defined sequence transmitted by the client UE 104*b* on query resources corresponding to the discovery preamble resources. The client UE 104*b* may transmit the query 314 on the corresponding query resources upon receiving a discovery preamble in which the client UE 104*b* is interested. For example, the client UE 104*b* may transmit the query 314 in response to one or more preambles indicating certain types of devices or services. The client UE 104*b* may use beamforming for the query 314 based on the received discovery preamble 312 (e.g., using channel estimation and beam training). The host UE 104*a* may listen for queries 314 on the corresponding query resources.

The discovery message 316 may be a transmission from the host UE 104*a* providing information regarding one or more services offered by the host UE 104*a*. The host UE 104*a* may transmit the discovery message 316 in response to receiving the query 314. The discovery message 316 may include more information than the discovery preamble 312 and may be transmitted using beamforming based on the query 314. For example, the discovery message 316 may include details regarding the service offered by the host UE 104*a*. By transmitting the larger portion of the discovery information in the discovery message 316 only in response to the query 314, the host UE 104*a* may limit the discovery resources used. In an aspect, resources designated for transmission of a discovery message 316 may be repurposed (e.g., used for data for an existing connection) when the discovery message 316 is not transmitted. Additionally, since beamforming of the discovery message 316 may be based on the query 314, the host UE 104*a* may avoid repetitions of the discovery message 316 on multiple beams, further reducing the resources used for discovery.

The RACH preamble 318 may be a transmission from the client UE 104*b* seeking to establish communications with the host UE 104*a*. The RACH preamble 318 may also be referred to as a RACH message 1 and may perform a similar role as a conventional RACH message 1. The RACH preamble 318, however, may be transmitted on the preconfigured discovery resources 310 rather than a dedicated RACH physical channel. As discussed in further detail below, the resources defined for the RACH preamble 318 may also be repurposed when the RACH preamble 318 is not transmitted.

The host UE 104*a* and client UE 104*b* may complete a RACH procedure based on the information obtained from the discovery procedure discussed above. Alternatively, a CV2X RACH procedure may follow other discovery procedures. The RACH procedure may include the RACH preamble 318 (RACH Message 1), RACH message 2 320, RACH message 3 322, and RACH message 4 324.

RACH message 2 320 may be transmitted by the host UE 104*a* in response to the RACH preamble 318 to indicate resources to be used by the client UE 104*b* for sending RACH message 3 322 and for receiving RACH message 4 324. RACH message 3 322 may be transmitted by the client UE 104*b* and may include a control channel and a data channel providing identification information for the client UE 104*b*. RACH message 4 424 may set up a radio resource control (RRC) connection between the host UE 104*a* and the client UE 104*b* that can be used for further communications.

Figure 4:
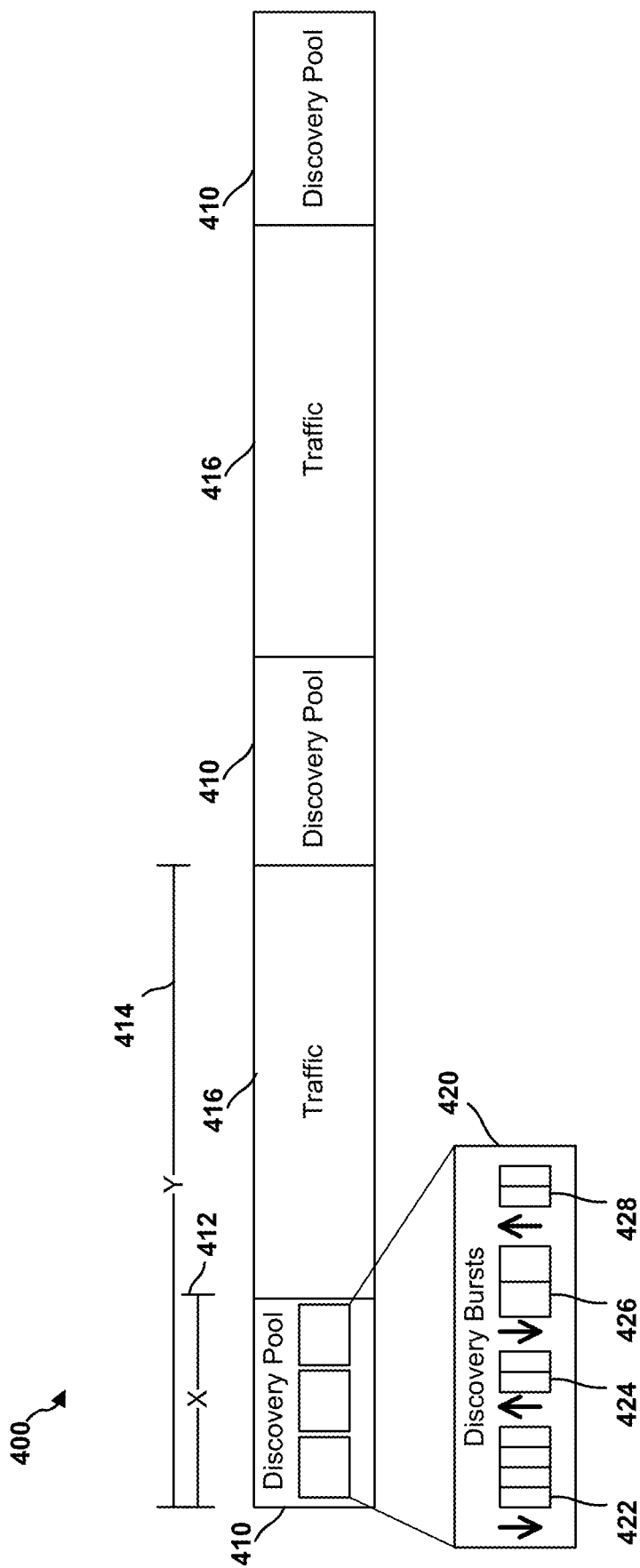
FIG. 4 is a resource diagram showing an example of a discovery pool including a discovery burst.

FIG. 4 is a resource diagram 400 showing an example allocation of preconfigured discovery resources. In an aspect, the preconfigured discovery resources may be allocated across multiple communications networks. For example, the preconfigured discovery resources may be specified by a regulatory agency or a standards setting organization. In another aspect, the preconfigured discovery resources may be allocated by a network operator on a licensed portion of spectrum. The base stations 102 may transmit an indication of the preconfigured discovery resources as system information. In another aspect, the preconfigured resources may be allocated by a regulatory agency or standards setting organization within a particular portion of a network operator's licensed spectrum. For example, a standard may define a lowest frequency portion of the network operator's licensed spectrum to periodically be used as the preconfigured discovery resources.

As illustrated in FIG. 4, the preconfigured discovery resources may include discovery pools 410 that may be allocated a constant bandwidth in the frequency-domain and periodically allocated in the time-domain. A discovery pool may be defined by a duration X 412 and a periodicity Y 414. Traffic 416 may be carried on the frequency-domain resources between the discovery pools 410. In an aspect, the periodicity Y 414 may be a multiple of the duration X 412. For example, the duration X 412 may be 1 second and the periodicity Y 414 may be 10 or 20 seconds.

The discovery pools 410 may include discovery bursts 420. A discovery burst 420 may be a set of resources including resources allocated for each of discovery preamble 312, query 314, discovery message 316, and RACH preamble 318. For example, a discovery burst 420 may include discovery preamble resources 422 allocated for discovery preamble 312, query resources 424 allocated for query 314, discovery message resources 426 allocated for discovery message 316, and RACH preamble resources 428 allocated for RACH preamble 318.

In an aspect, the resources of a discovery burst 420 may be arranged sequentially in the time domain such that the discovery procedure illustrated in FIG. 3 may be performed within a single discovery pool 410. Additionally, a discovery burst 420 may be defined such that later resources correspond to one or more earlier resources. For example, a client UE 104*b*, upon receiving a discovery preamble 312 on a discovery preamble resource 422, may determine a corresponding query resource 424 for transmitting a query 314. For example, a table or formula may be used to determine the corresponding query resource. The discovery message resource 426 may likewise correspond to one or more discovery preamble resources 422 as multiple discovery preambles 312 may be transmitted on different beams for the same discovery message 316. In an aspect, the RACH preamble resource 418 may also be based on the discovery preamble resources 422. In another aspect, the discovery message 316 may include an indication of resources to use as the RACH preamble resources 428.

Figure 5:
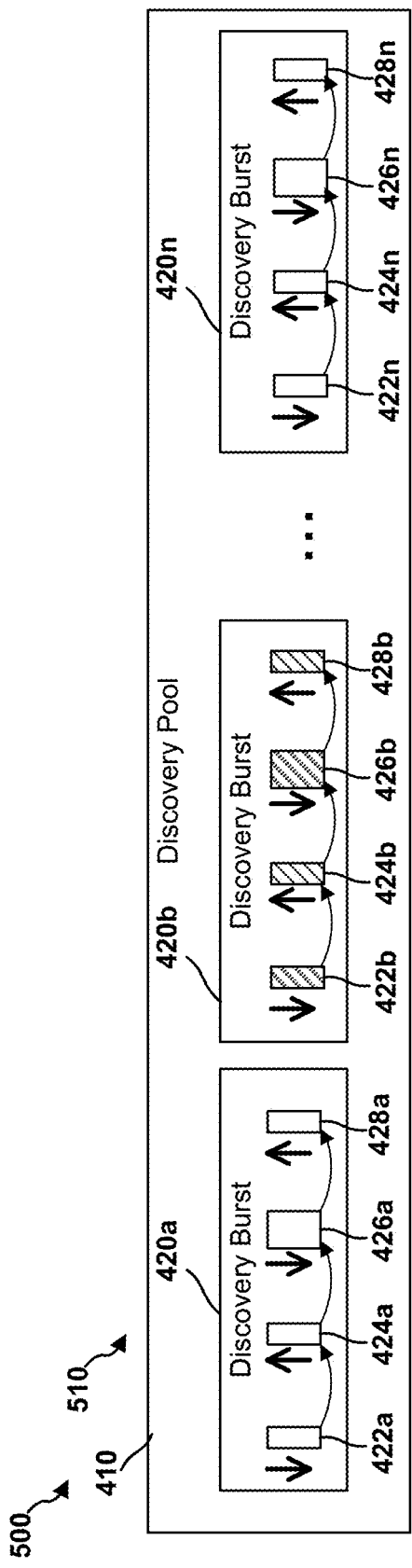
FIG. 5 is a resource diagram showing an example configuration of discovery resources using non-overlapping discovery bursts.

FIG. 5 is a resource diagram 500 showing an example configuration 510 of discovery bursts 420 within a discovery pool 410. The configuration 510 may use time division multiplexing of non-overlapping discovery bursts. For example, the configuration 510 may include a number (n) of discovery bursts 420 and each discovery burst 420 may include each of the discovery preamble resources 422, query resources 424, discovery message resources 426, and RACH preamble resources 428. The discovery preamble resources 422 may be limited to a small number of beams (e.g., 1), and the other resources may be used to respond to the discovery preamble 312 transmitted on the small number of beams. For example, the query resource 424*a* may correspond to the discovery preamble resource 422*a* within the same discovery burst 420*a*. Accordingly, the configuration 510 may allow for early feedback regarding a discovery preamble 312. If the host UE 104*a* receives early feedback (e.g., in discovery burst 420*a*), the host UE 104*a* may save power by stopping a beamforming sweep (e.g., by not transmitting in discovery bursts 420*b*-*n*). The host UE 104*a* may also switch to a receive mode and act as a client UE 104*b* for the remaining discovery bursts 420*b*-*n*. That is, the host UE 104*a* may use a client discovery component 196 to receive a discovery preamble 312 transmitted by another device (e.g., a client UE 104*b*). In an aspect, the host UE 104*a* may reconfigure a beam sweeping pattern in response to early feedback. For example, the host UE 104*a* may transmit additional beams carrying the discovery preamble 312 in similar directions if a query 314 is received in order to provide a basis for beam training.

Figure 6:
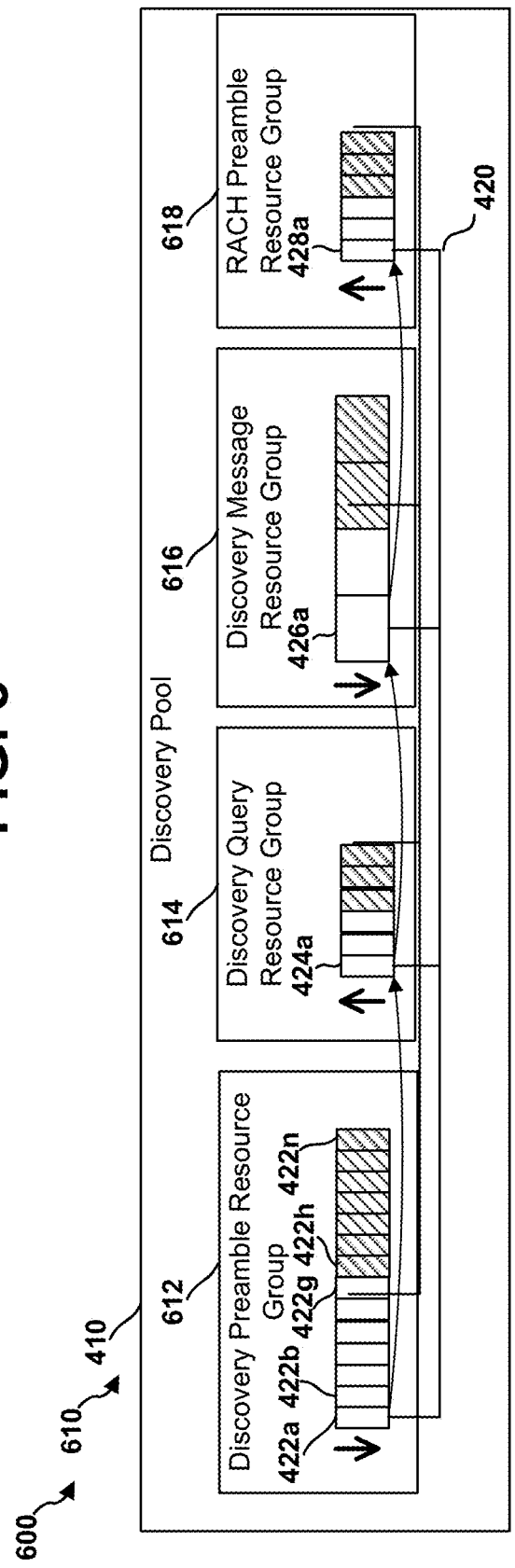
FIG. 6 is a resource diagram showing an example configuration of discovery resources using resource groups.

FIG. 6 is a resource diagram 600 showing an example configuration 610 of discovery bursts 420 within a discovery pool 410. The configuration 610 may use interleaved discovery bursts. For example, the configuration 610 may include a discovery preamble resource group 612 including discovery preamble resources 422*a*-422*n* for transmitting one or more discovery preambles 312 on different beams (e.g., all discovery preambles 312 transmitted within the discovery pool 420). Similarly, the configuration 610 may include a discovery query resource group 614, a discovery message resource group 616, and a RACH preamble resource group 618. The transmission of the discovery preamble 312 in the discovery preamble resource group 612 may allow a client UE 104*b* to receive multiple beams and select the best beam using the discovery query resource group 614 (e.g., by selecting the query resource 424*a* corresponding to the best beam of discovery preamble resource 422*a*). In comparison to the configuration 510, however, the configuration 610 may not provide an opportunity for early feedback. Additionally, configurations of discovery resources between configuration 510 and configuration 610 may be used, for example, where resources are arranged into multiple bursts of smaller resource groups.

In an aspect, a UE 104 may act as both a host UE 104*a* and a client UE 104*b*. A UE 104, however, may not be able to simultaneously transmit and receive within the same frequency band. A discovery pool 410 may include a plurality of sub-pools that may be used by different UEs for performing the discovery procedure. The sub-pools may have equal or different numbers of resources. Further, a single UE may act as a host UE 104*a* on a first sub-pool and act as a client UE 104*b* on a second sub-pool. For example, in FIG. 5, the discovery burst 420*a* and 420*n* may be in a first sub-pool and discovery burst 420*b* may be in a different sub-pool. As another example, in FIG. 6, the first half of the resources in each resource group (e.g., discovery preamble resources 422*a*-422*g*) may form a first sub-pool, and a second half of the resources in each resource group (e.g., discovery preamble resources 422*h*-422*n*) may form a second sub-pool. The granularity of the sub-pool division may be symbol level, burst level, or resource group level. In an aspect, a UE 104 may select one of a plurality of predefined transmit/receive patterns. Each pattern may include a different combination of sub-pools for transmitting and receiving. The UE 104 may select the transmit/receive pattern randomly, pseudo-randomly, based on a device parameter such as an identifier, indicated by another device, or based on a measurement (e.g., sensing to determine which sub-pools are being used).

In an aspect, a device such as a host UE 104*a* may perform discovery via a plurality of transmit or receive beams. The device may be capable of transmitting on a plurality of available beams depending on a number of antennas, types of antennas, and configured precoding matrices or grids. The device may determine which beams to use over the selected sub-pools (e.g., on the discovery preamble resources 422). The beam selection may be subject to the device sweeping all or a subset of Tx/Rx beams available to the device over the selected resources. That is, the device may attempt to sweep beams in all directions subject to limited resources. If the device is capable of transmitting more beams than the preconfigured discovery preamble resources 422, the device may select a subset of the available beams to transmit. In an aspect, the beam selection may not necessarily follow a sequential or round-robin sweeping pattern. For example, the device may choose the beam randomly, or may weight selection based on known information (e.g., geographic orientation or historically successful beams).

In an aspect, the selection of sub-pools and/or beam selection may follow a repetitive pattern. If a receiving device is aware of a repeated pattern, the receiving device may perform joint processing of multiple repetitions (e.g., for non-coherent combining or beam training). In an aspect, a device may repeat a selection for a number K of discovery pools 410. For example, a K value of 0 would mean the pattern does not repeat and the receiving device cannot assume any relationship for subsequent pools. Conversely, a K value of infinity would be a continuous repetitive pattern. K may be a fixed value, which may be known to other devices. For example, a standard may define a K value of 2 where all odd discovery pools 410 are repeated. In another aspect, K may be unknown. For example, the device may repeat a selected pattern until an event occurs (e.g., establishing a certain number of connections.

In an aspect, an allocation of system wide preconfigured resources for discovery signals may incur a significant amount of overhead that may reduce resources available for other uses. The present disclosure includes various techniques that may be used to reduce the overhead of the discovery signals discussed above.

In an aspect, a device may repurpose some or all of the resources within a discovery pool 410. For example, the device may use the resources of the discovery pool 410 for non-discovery communications. In one case, a device not attending to a discovery procedure (e.g., not offering a service) may use the resources of the discovery pool 410 for other purposes. In other cases, the discovery pool 410 may include multiple sub-pools of resources, and a device may not utilize all of the sub-pools of resources for discovery, in which case the unused sub-pools of resources may be repurposed. For example, the device may schedule transmissions for existing connections on the unused sub-pools of discovery resources. In another aspect, the query 314 may be used to determine whether the discovery resources can be repurposed. For example, after the host UE 104a transmits the discovery preamble 312, if no query 314 is received, the discovery message resources 426 and RACH preamble resources 428 may not be used. Accordingly, the host UE 104a may repurpose the discovery message resources 426 and RACH preamble resources 428. For instance, the host UE 104a may use the discovery resources for communicating with a previously discovered client UE 104b. In an aspect, the discovery preamble resources 422 and the query resources 424 may be protected from repurposing even if the host UE 104a is not performing discovery, while the discovery message resources 426 and RACH preamble resources 428 may be subject to repurposing (e.g., if no other device transmitted on the discovery preamble resources 422 and the query resources 424).

In another aspect, the overhead of the discovery resources may be reduced by limiting the dedicated discovery resources to a small portion of overall resources. A device that has non-discovery resources available may perform opportunistic discovery using the non-discovery resources. For example, a host UE 104a that may periodically engage in communication sessions with one or more client UEs 104b may configure the one or more client UEs 104b for opportunistic discovery on other resources during an initial communication session, and then use the non-discovery resources to establish the subsequent communication sessions. In another aspect, non-discovery resources that may be used for discovery may be standardized or indicated by system information.

Figure 7:
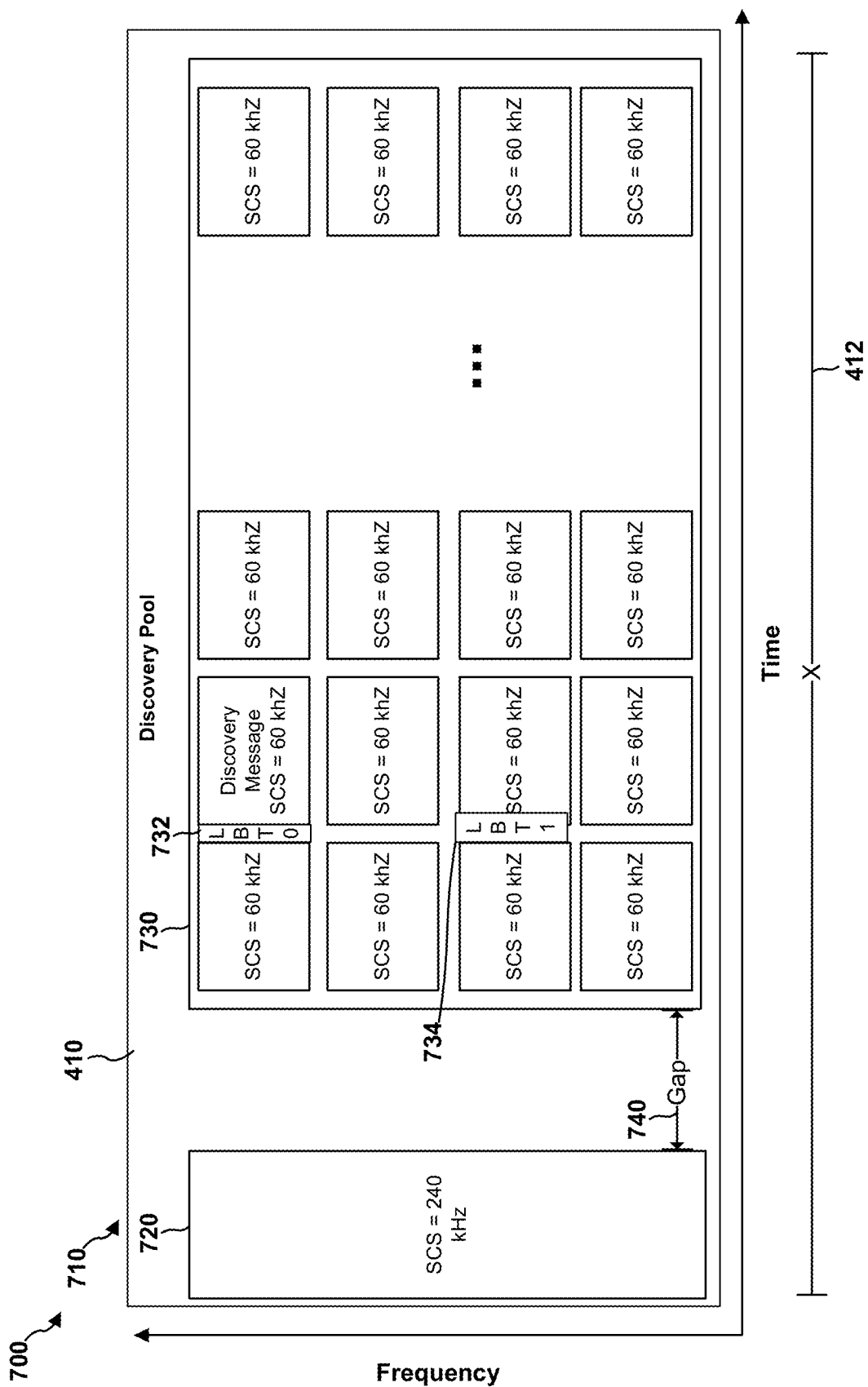
FIG. 7 is a resource diagram showing an example configuration of discovery resources with a preamble portion and a message portion.

FIG. 7 is a resource diagram 700 showing an example configuration 710 of a discovery pool 410 that is divided in the time domain into a preamble portion 720 and a message portion 730 separated by a gap 740. The preamble portion 720 and the message portion 730 may use different numerologies. For example, a sub-carrier spacing (SCS) of the preamble portion 720 may be 240 kHz and the SCS of the message portion 730 may be 60 kHz. The discovery preamble 312 and the query 314 may be transmitted in the preamble portion. The discovery message 316 may be transmitted in the message portion 730. The gap 740 may allow the UE 104 to repurpose the message portion 730 if no query 314 is received. The preamble portion 720 may be relatively shorter than the message portion. In one example, the preamble portion 720 may be 1 millisecond (ms) and the message portion may be 12 ms. The message portion may include a number of bursts corresponding to a number of bursts in the preamble portion (e.g., 12 symbols). In another example, the message portion may be longer (e.g., 10 or 20 ms) and the message resources may be more sparsely allocated and become part of resources for normal traffic 416 (FIG. 4), as compared to having a separate preconfigured discovery resources pool. The resources may be chosen for discovery based on an algorithm known a priori in both client UE 104b and host UE 104a, for example, an algorithm defined in a standards document. The resource selection may be based on the preamble resource selected and discovery preamble 312 transmitted in preamble portion 720 of the discovery pool 410. As the resources in message portion 730 may not be exclusively dedicated for discovery usage, UEs performing discovery procedures and UEs performing non-discovery procedures may compete for the usage of the resources in the message portion 730 of the discovery pool 410. Regarding this competition, the discovery pool 410 may have a preferred or non-preferred treatment for discovery. If the discovery pool 410 is indicated as preferred for discovery, a UE performing a discovery procedure utilizing an intended resource in message portion 730 may use a listen-before-talk (LBT) counter 732 of a smaller value (e.g. 0) compared to the LBT counter values (e.g., 1, 2, etc.) used by the UE seeking to repurpose resources for non-discovery procedure in the discovery pool 410. Accordingly, when there is a host UE 104a attempting to perform discovery, the host UE 104a should win a contention procedure for the discovery pool 410. If the discovery pool 410 is indicated as non-preferred for discovery, discovery may be allowed, but not given priority over other transmissions). For example, a UE performing a discovery procedure may use the intended resource in message portion 730, but may use a listen-before-talk (LBT) counter with a longer duration, compared to the LBT counter used by a UE seeking to repurpose resources for non-discovery procedure in the discovery pool 410. The discovery pool 410 may have a duration of X 412 and a periodicity Y 414 (FIG. 4) of 10-20 seconds.

Figure 8:
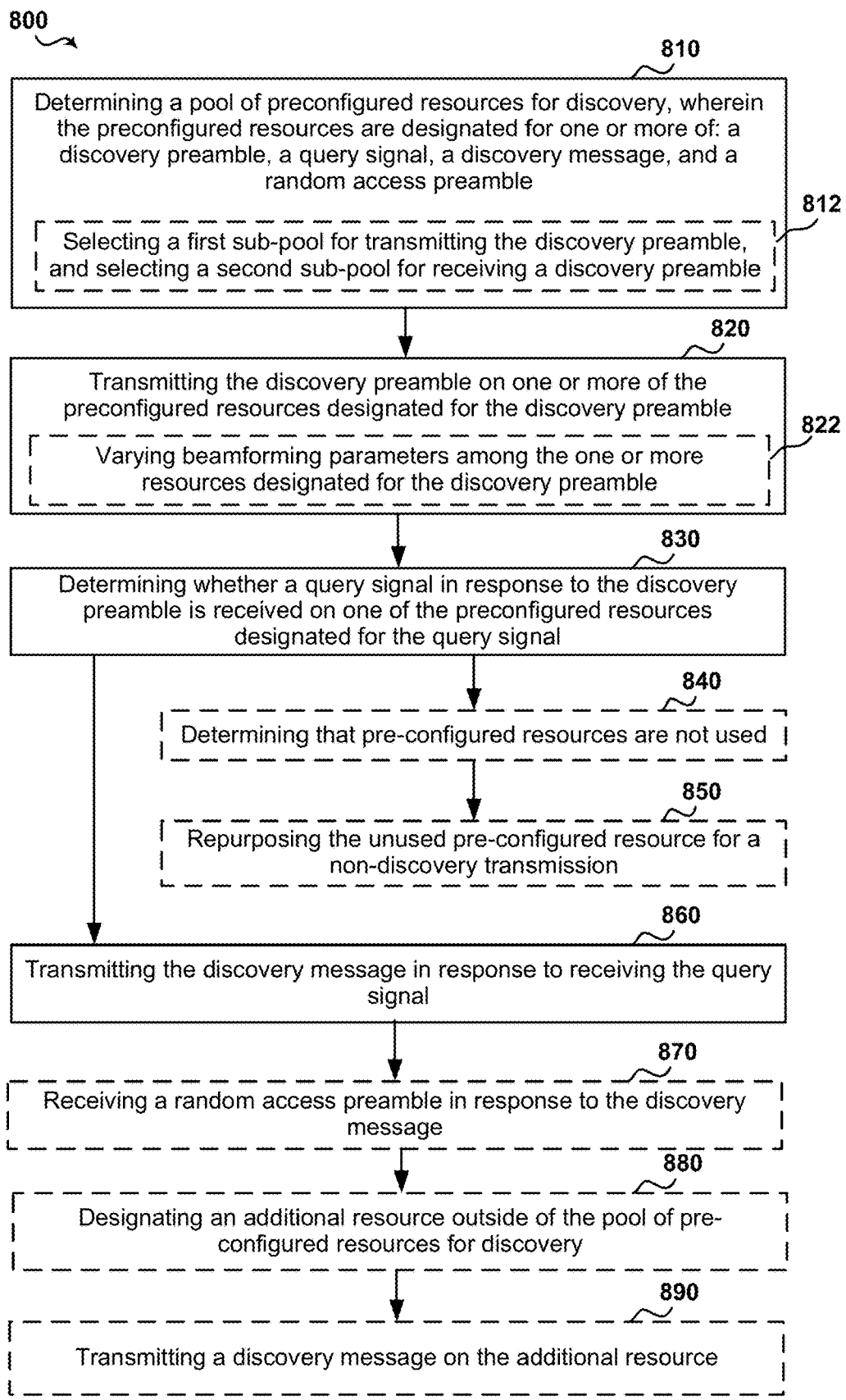
FIG. 8 is a flowchart of an example method of wireless communication by a host UE or base station.

FIG. 8 is a flowchart of a method 800 of wireless communication for a host UE 104a or base station 102 in a CV2X system. The method 800 may be performed by an apparatus such as the host discovery component 194 in conjunction with the processor 1012 of the host UE 104a or base station 102. Optional blocks are shown in dashed lines.

At block 810, the method 800 may include determining a pool of preconfigured resources for discovery. The preconfigured resources may be designated for one or more of a discovery preamble, a query signal, a discovery message, and a random access preamble. In an aspect, for example, the resource component 1020 may determine the pool of preconfigured resources. For example, the resource component 1020 may determine that the pool of preconfigured resources are configured according to one of configuration 510, 610, or 710. For instance, the resource component 1020 may determine the configuration based on an applicable standard and/or system information indicating the preconfigured resources. In an aspect, the pool of preconfigured resources for discovery may be divided into a plurality of sub-pools. At sub-block 812, the block 810 may include selecting a first sub-pool for transmitting the discovery preamble, and selecting a second sub-pool for receiving a discovery preamble. For instance, the selection component 1022 may select the first sub-pool for transmitting the discovery preamble, and select the second sub-pool for receiving a discovery preamble.

At block 820, the method 800 may include transmitting the discovery preamble on one or more of the preconfigured resources designated for the discovery preamble. In an aspect, for example, the beamforming component 1026 may transmit the discovery preamble 312 on one or more of the discovery preamble resources 422 designated for the discovery preamble. In an aspect, the beamforming component 1026 may use beamforming to transmit the discovery preamble on one or more beams. In sub-block 822, the block 820 may include varying beamforming parameters among the one or more resources designated for the discovery preamble. For example, the beamforming component 1026 may vary the beamforming parameters among the preconfigured resources designated for the discovery preamble. In an aspect, the beamforming component 1026 may transmit the discovery preamble on each available beam using the one or more resources designated for the discovery preamble. In another aspect, the beamforming component 1026 may randomly or pseudo-randomly select beams for transmitting the discovery preamble.

In block 830, the method 800 may include determining whether a query signal in response to the discovery preamble is received on one of the preconfigured resources designated for the query signal. In an aspect, for example, the beamforming component 1026 may determining whether the query 314 is received on a query resource 424 designated for the query signal in response to the discovery preamble 312.

In block 840, the method 800 may optionally include determining that preconfigured resources are unused preconfigured resources for a discovery procedure. In an aspect, for example, repurposing component 1024 may determine that preconfigured resources are unused preconfigured resources for the discovery procedure. For example, the repurposing component 1024 may determine that the preconfigured resources are unused preconfigured resources in response to determining that the query 314 is not received.

In block 850, the method 800 may optionally include repurposing the unused preconfigured resources for a non-discovery transmission. The block 850 may be performed in response to determining that at least some of the preconfigured resources are unused preconfigured resources. In an aspect, for example, the repurposing component 1024 may repurpose the unused preconfigured resources for a non-discovery transmission. In an aspect, the repurposing component 1024 may wait to start the non-discovery transmission for a listen-before-talk counter 734 that has a duration that is greater than a duration of a listen-before-talk counter 732 used for discovery transmissions when repurposing the unused preconfigured resources.

In block 860, the method 800 may include transmitting the discovery message in response to receiving the query signal. In an aspect, for example, beamforming component 1026 may transmit the discovery message 316 in response to receiving the query 314. The beamforming component 1026 may use the discovery message resources 426 to transmit the discovery message. The beamforming component 1026 may use beamforming based on the received query 314 to transmit the discovery message.

In block 870, the method 800 may optionally include receiving a random access preamble in response to the discovery message. In an aspect, for example, the beamforming component 1026 may receive the random access preamble 318 in response to the discovery message. The random access preamble 318 may be received on the RACH preamble resource 428.

In block 880, the method 800 may optionally include designating an additional resource outside of the pool of preconfigured resources for discovery. In an aspect, for example, the host discovery component 194 may designate an additional resource outside of the discovery pool 410 of preconfigured resources for discovery. The additional resource may allow the base station 102 or the host UE 104a to communicate with a client UE 104b on a different schedule than the schedule of the preconfigured discovery resources.

In block 890, the method 800 may optionally include transmitting a discovery message on the additional resource. In an aspect, for example, the beamforming component 1026 may transmit the discovery message on the additional resource. The discovery message on the additional resource may be an additional transmission of the same discovery message 316 in block 860, or may be a discovery message for a different service. For example, a client UE 104b may receive the additional transmission to resume a previous RRC connection with the base station 102 or host UE 104a without waiting for the predefined discovery resources.

Figure 9:
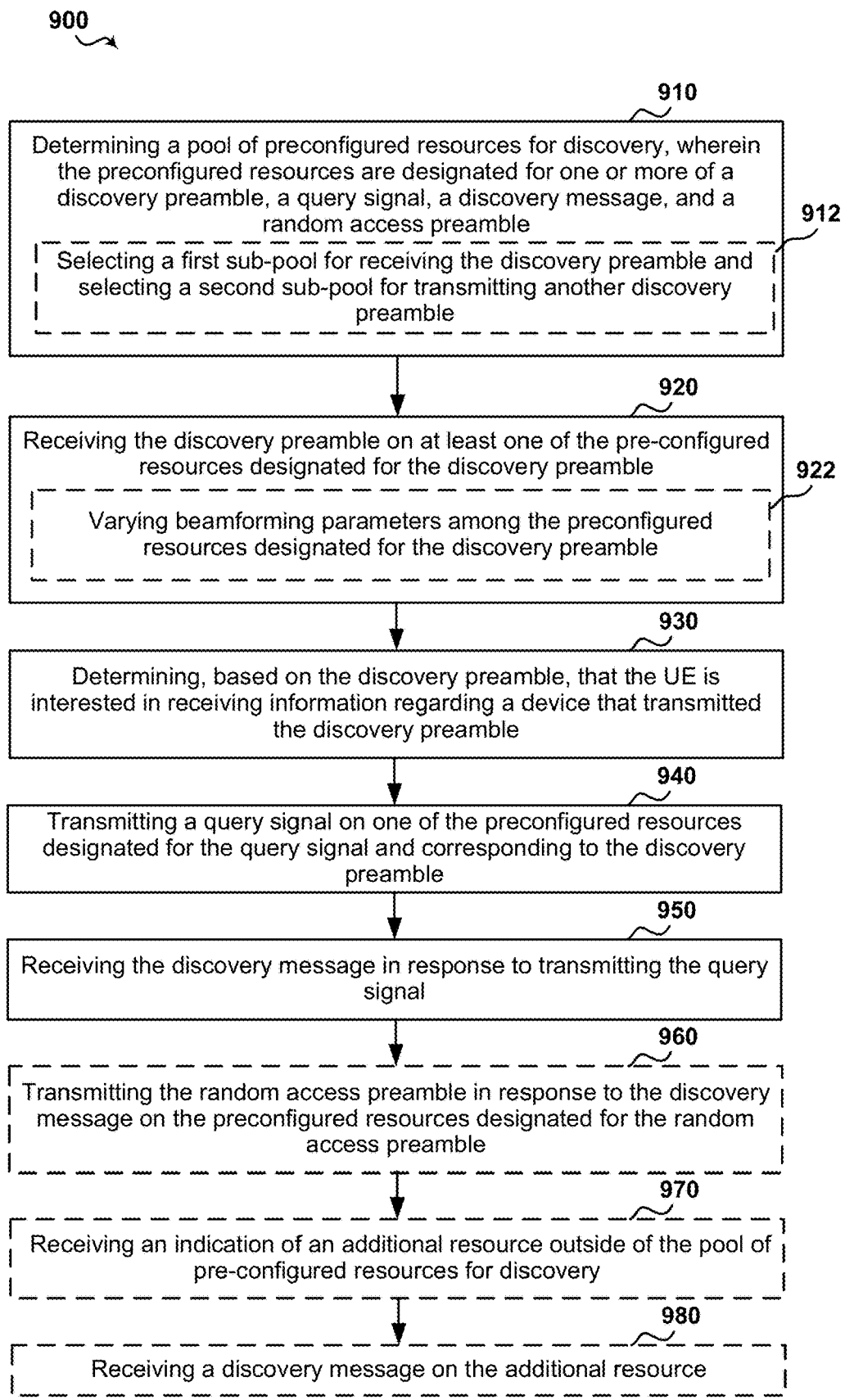
FIG. 9 is a flowchart of an example method of wireless communication by a client UE.

FIG. 9 is a flowchart of a method 900 of wireless communication for a client UE 104b in a CV2X system. The method 900 may be performed by an apparatus such as the client discovery component 196 of the client UE 104b. Optional blocks are shown in dashed lines.

In block 910, the method 900 may include determining a pool of preconfigured resources for discovery. The pool of preconfigured resources are designated for one or more of a discovery preamble, a query signal, a discovery message, and a random access preamble. In an aspect, for example, the resource component 1030 may determine the discovery pool 410 of preconfigured resources for discovery. For instance, the resource component 1030 may determine the configuration based on an applicable standard and/or system information indicating the preconfigured resources. In an aspect, the block 910 may include the optional sub-block 912, which may include selecting a first sub-pool for receiving the discovery preamble and selecting a second sub-pool for transmitting another discovery preamble. In an aspect, for example, the selection component 1032 may select the first sub-pool for receiving the discovery preamble and select the second sub-pool for transmitting the other discovery preamble. For example, the client UE 104b may use the first sub-pool for monitoring for a discovery preamble 312 and responding if interested. The client UE 104b may use the second sub-pool for advertising a service offered by the client UE 104b acting as a host UE 104a.

In block 920, the method 900 may include receiving the discovery preamble on at least one of the preconfigured resources designated for the discovery preamble. In an aspect, for example, the beamforming component 1036 may receive the discovery preamble 312 on at least one of the preconfigured discovery preamble resources 422 designated for the discovery preamble. In an aspect, at sub-block 922, the block 920 may optionally include varying beamforming parameters among the preconfigured resources designated for the discovery preamble. For example, the beamforming component 1036 may vary the beamforming parameters among the preconfigured discovery preamble resources 422 designated for the discovery preamble. Varying the beamforming parameters may allow the client UE 104b to better receive a signal if the beam is pointed toward the transmitting device. Accordingly, by varying the beamforming parameters, the client UE 104b may sweep for signals.

In block 930, the method 900 may include determining, based on the discovery preamble, that the UE is interested in receiving information regarding a device that transmitted the discovery preamble. In an aspect, for example, the interest component 1034 may determine that the client UE 104b is interested in receiving information regarding a device (e.g., a host UE 104a) that transmitted the discovery preamble. For example, the interest component 1034 may compare the received discovery preamble 312 to a set of preambles in which the client UE 104b has interest.

In block 940, the method 900 may include transmitting a query signal on one of the preconfigured resources designated for the query signal and corresponding to the discovery preamble. For example, the beamforming component 1026 may transmit the query 314 on the query resource 424 corresponding to the discovery preamble 312. The beamforming component 1036 may select the query resource 424 based on the discovery preamble resource 422 carrying the received discovery preamble 312 or on the discovery preamble resource 422 carrying the strongest discovery preamble 312 if multiple discovery preambles are received.

In block 950, the method 900 may include receiving the discovery message in response to transmitting the query signal. In an aspect, for example, the beamforming component 1036 may receive the discovery message 316 in response to transmitting the query 314. The discovery message 316 may include information regarding a service offered by the device that transmitted the discovery preamble 312. The discovery message 316 may be received on discovery message resources 426 corresponding to the query resources 424.

In block 960, the method 900 may optionally include transmitting a random access preamble in response to the discovery message on the preconfigured resources designated for the random access preamble. In an aspect, for example, the beamforming component 1036 may transmit the random access preamble in response to the discovery message on the preconfigured RACH preamble resources 428 designated for the random access preamble.

In block 970, the method 900 may optionally include receiving an indication of an additional resource outside of the pool of preconfigured resources for discovery. In an aspect, for example, the beamforming component 1026 may receive the indication of an additional resource outside of the pool of preconfigured resources for discovery. For example, the indication of the additional resource may be received via an RRC connection with a host device.

In block 980, the method 900 may optionally include receiving a discovery message on the additional resource. In an aspect, for example, the beamforming component 1026 may receive the discovery message on the additional resource. For example, the discovery message on the additional resource may be used to resume the previous RRC connection.

Referring to FIG. 10, one example of an implementation of UE 104 may include a variety of components, some of which have already been described above, but including components such as one or more processors 1012 and memory 1016 and transceiver 1002 in communication via one or more buses 1044, which may operate in conjunction with modem 1014, host discovery component 194 and client discovery component 196 to enable one or more of the functions described herein related to discovery procedures for CV2X Further, the one or more processors 1012, modem 1014, memory 1016, transceiver 1002, RF front end 1088 and one or more antennas 1065 may be configured to support voice and/or data calls (simultaneously or non-simultaneously) in one or more radio access technologies.

In an aspect, the one or more processors 1012 may include a modem 1014 that uses one or more modem processors. The various functions related to host discovery component 194 and client discovery component 196 may be included in modem 1014 and/or processors 1012 and, in an aspect, may be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1014 associated with host discovery component 194 and client discovery component 196 may be performed by transceiver 1002.

Also, memory 1016 may be configured to store data used herein and/or local versions of applications 1075, host discovery component 194, client discovery component 196 and/or one or more of subcomponents thereof being executed by at least one processor 1012. Memory 1016 may include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining host discovery component 194, client discovery component 196 and/or one or more of subcomponents thereof, and/or data associated therewith, when UE 104 is operating at least one processor 1012 to execute host discovery component 194 and client discovery component 196 and/or one or more subcomponents thereof.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 102. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, UE 104 may include RF front end 1088, which may operate in communication with one or more antennas 1065 and transceiver 1002 for receiving and transmitting radio transmissions, for example, wireless communications transmitted by at least one base station 102 or wireless transmissions transmitted by UE 104. RF front end 1088 may be connected to one or more antennas 1065 and may include one or more low-noise amplifiers (LNAs) 1090, one or more switches 1092, one or more power amplifiers (PAs) 1098, and one or more filters 1096 for transmitting and receiving RF signals.

In an aspect, LNA 1090 may amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 may be used by RF front end 1088 to filter a received signal to obtain an input RF signal. Similarly, in an aspect, for example, a respective filter 1096 may be used to filter an output from a respective PA 1098 to produce an output signal for transmission. In an aspect, each filter 1096 may be connected to a specific LNA 1090 and/or PA 1098. In an aspect, RF front end 1088 may use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver 1002 may be tuned to operate at specified frequencies such that UE 104 can communicate with, for example, one or more base stations 102 or one or more cells associated with one or more base stations 102. In an aspect, for example, modem 1014 may configure transceiver 1002 to operate at a specified frequency and power level based on the UE configuration of the UE 104 and the communication protocol used by modem 1014.

In an aspect, modem 1014 may be a multiband-multimode modem, which can process digital data and communicate with transceiver 1002 such that the digital data is sent and received using transceiver 1002. In an aspect, modem 1014 may be multiband and be configured to support multiple frequency bands for a specific communications protocol. In an aspect, modem 1014 may be multimode and be configured to support multiple operating networks and communications protocols. In an aspect, modem 1014 may control one or more components of UE 104 (e.g., RF front end 1088, transceiver 1002) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Referring to FIG. 11, one example of an implementation of base station 102 may include a variety of components, some of which have already been described above, but including components such as one or more processors 1112 and memory 1116 and transceiver 1102 in communication via one or more buses 1144, which may operate in conjunction with modem 1114 and host discovery component 194 to enable one or more of the functions described herein related to CV2X discovery procedures.

The transceiver 1102, receiver 1106, transmitter 1108, one or more processors 1112, memory 1116, applications 1175, buses 1144, RF front end 1188, LNAs 1190, switches 1192, filters 1196, PAs 1198, and one or more antennas 1165 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications, comprising:
   determining a pool of preconfigured resources for discovery, wherein the preconfigured resources are designated for one or more of: a discovery preamble, a query signal, a discovery message, and a random access preamble;
   transmitting the discovery preamble on one or more of the preconfigured resources designated for the discovery preamble;
   determining whether a query signal in response to the discovery preamble is received on one of the preconfigured resources designated for the query signal; and
   transmitting a discovery message in response to receiving the query signal.

2. The method of claim 1, further comprising receiving a random access preamble in response to the discovery message.

3. The method of claim 1, further comprising:
   determining that at least some of the preconfigured resources are unused preconfigured resources for a discovery procedure; and
   repurposing the unused preconfigured resources for a non-discovery transmission.

4. The method of claim 3, wherein determining that at least some of the preconfigured resources are unused preconfigured resources for a discovery procedure comprises determining that the query signal is not received.

5. The method of claim 3, wherein repurposing the unused preconfigured resources includes waiting to start the non-discovery transmission for a listen-before-talk counter having a duration that is greater than a duration of a listen-before-talk counter used for discovery transmissions.

6. The method of claim 1, wherein the pool of preconfigured resources for discovery includes one or more sub-pools of preconfigured resources that are not exclusively used for discovery purposes, wherein the method includes contending for usage of the one or more sub-pools with non-discovery transmissions.

7. The method of claim 6, wherein contending for usage of the one or more sub-pools includes waiting to start transmitting the discovery message for a listen-before-talk counter that is different than a listen-before-talk counter used for non-discovery transmissions.

8. The method of claim 1, wherein the pool of preconfigured resources for discovery is divided into a number of sub-pools, and wherein determining the pool of preconfigured resources comprises selecting a first sub-pool for transmitting the discovery preamble, and selecting a second sub-pool for receiving a discovery preamble.

9. The method of claim 8, wherein selecting the first sub-pool comprises repeating at least the transmission of the discovery preamble using the first sub-pool for a specified number of times.

10. The method of claim 1, wherein transmitting the discovery preamble comprises varying beamforming parameters among the preconfigured resources designated for the discovery preamble.

11. The method of claim 10, wherein transmitting the discovery preamble comprises transmitting the discovery preamble on each available beam using the one or more preconfigured resources designated for the discovery preamble.

12. The method of claim 10, wherein varying beamforming parameters among the preconfigured resources designated for the discovery preamble comprises selecting beams randomly, pseudo-randomly, or based on device orientation.

13. The method of claim 1, further comprising:
designating an additional resource outside of the pool of preconfigured resources for discovery; and
transmitting a discovery message on the additional resource.

14. An apparatus for wireless communications, comprising:
a memory; and
a processor communicatively coupled to the memory and configured to:
determine a pool of preconfigured resources for discovery, wherein the preconfigured resources are designated for one or more of: a discovery preamble, a query signal, a discovery message, and a random access preamble;
transmit the discovery preamble on one or more of the preconfigured resources designated for the discovery preamble;
determine whether a query signal in response to the discovery preamble is received on one of the preconfigured resources designated for the query signal; and
transmit a discovery message in response to receiving the query signal.

15. The apparatus of claim 14, wherein the processor is configured to receive a random access preamble in response to the discovery message.

16. The apparatus of claim 14, wherein the processor is configured to:
determine that at least some of the preconfigured resources are unused preconfigured resources for a discovery procedure; and
repurpose the unused preconfigured resources for a non-discovery transmission.

17. The apparatus of claim 16, wherein the processor is configured to determine that at least some of the preconfigured resources are unused preconfigured resources for a discovery procedure in response to determining that the query signal is not received.

18. The apparatus of claim 16, wherein the processor is configured to wait to start the non-discovery transmission for a listen-before-talk counter having a duration that is greater than a duration of a listen-before-talk counter used for discovery transmissions.

19. The apparatus of claim 14, wherein the pool of preconfigured resources for discovery includes one or more sub-pools of preconfigured resources that are not exclusively used for discovery purposes, wherein the processor is configured to contend for usage of the one or more sub-pools with non-discovery transmissions.

20. The apparatus of claim 19, wherein the processor is configured to wait to start transmitting the discovery message for a listen-before-talk counter that is different than a listen-before-talk counter used for non-discovery transmissions.

21. The apparatus of claim 14, wherein the pool of preconfigured resources for discovery is divided into a number of sub-pools, and wherein the processor is configured to select a first sub-pool for transmitting the discovery preamble, and select a second sub-pool for receiving a discovery preamble.

22. The apparatus of claim 21, wherein the processor is configured to repeat at least the transmission of the discovery preamble using the first sub-pool for a specified number of times.

23. The apparatus of claim 14, wherein the processor is configured to vary beamforming parameters among the preconfigured resources designated for the discovery preamble.

24. The apparatus of claim 23, wherein the processor is configured to transmit the discovery preamble on each available beam using the one or more preconfigured resources designated for the discovery preamble.

25. The apparatus of claim 23, wherein the processor is configured to randomly or pseudo-randomly select beams.

26. The apparatus of claim 14, wherein the processor is configured to:
designate an additional resource outside of the pool of preconfigured resources for discovery; and
transmit a discovery message on the additional resource.

27. A method of wireless communications for a user equipment (UE), comprising:
determining a pool of preconfigured resources for discovery, wherein the preconfigured resources are designated for one or more of: a discovery preamble, a query signal, a discovery message, and a random access preamble;
receiving the discovery preamble on at least one of the preconfigured resources designated for the discovery preamble;
determining, based on the discovery preamble, that the UE is interested in receiving information regarding a device that transmitted the discovery preamble;
transmitting a query signal on one of the preconfigured resources designated for the query signal and corresponding to the discovery preamble; and
receiving the discovery message in response to transmitting the query signal.

28. The method of claim 27, further comprising transmitting the random access preamble in response to the discovery message on the preconfigured resources designated for the random access preamble.

29. The method of claim 27, wherein the pool of preconfigured resources for discovery is divided into a number of sub-pools, and wherein determining the pool of preconfigured resources comprises selecting a first sub-pool for receiving the discovery preamble and selecting a second sub-pool for transmitting another discovery preamble.

30. The method of claim 29, wherein selecting the first sub-pool comprises monitoring the selected first sub-pool for receiving the discovery preamble.

31. The method of claim 27, wherein receiving the discovery preamble comprises varying beamforming parameters among the preconfigured resources designated for the discovery preamble.

32. The method of claim 27, further comprising:
receiving an indication of an additional resource outside of the pool of preconfigured resources for discovery; and
receiving a discovery message on the additional resource.

33. An apparatus for wireless communications for a user equipment (UE), comprising:
a memory; and
a processor communicatively coupled to the memory and configured to:
determine a pool of preconfigured resources for discovery, wherein the preconfigured resources are designated for one or more of: a discovery preamble, a query signal, a discovery message, and a random access preamble;
receive the discovery preamble on at least one of the preconfigured resources designated for the discovery preamble;
determine, based on the discovery preamble, that the UE is interested in receiving information regarding a device that transmitted the discovery preamble;
transmit a query signal on one of the preconfigured resources designated for the query signal and corresponding to the discovery preamble; and
receive the discovery message in response to transmitting the query signal.

34. The apparatus of claim 33, wherein the processor is configured to transmit the random access preamble in response to the discovery message on the preconfigured resources designated for the random access preamble.

35. The apparatus of claim 33, wherein the pool of preconfigured resources for discovery is divided into a number of sub-pools, and wherein the processor is configured to select a first sub-pool for receiving the discovery preamble and to select a second sub-pool for transmitting another discovery preamble.

36. The apparatus of claim 35, wherein the processor is configured to monitor the selected first sub-pool for receiving the discovery preamble.

37. The apparatus of claim 33, wherein the processor is configured to vary beamforming parameters among the preconfigured resources designated for the discovery preamble.

38. The apparatus of claim 33, wherein the processor is configured to:
receive an indication of an additional resource outside of the pool of preconfigured resources for discovery; and
receive a discovery message on the additional resource.

* * * * *